DIGITAL FILTERS

Filed July 19, 1967

*INVENTORS*
R. VAN BLERKOM
D. G. FREEMAN

J. Janein Jr.
*ATTORNEY*

United States Patent Office 3,521,041
Patented July 21, 1970

3,521,041

DIGITAL FILTERS

Richard Van Blerkom, Rockville, and Don G. Freeman, Gaithersburg, Md., assignors to International Business Machines Corporation, Armonk, N.Y., a corporation of New York Filed July 19, 1967, Ser. No. 654,417
Int. Cl. G06f *7/38;* G01v *1/28*
U.S. Cl. 235—156 4 Claims

ABSTRACT OF THE DISCLOSURE

A digital filter including multipliers which multiply a digital signal by a binary number, said binary number including both positive and negative binary digits. The multiplier may consist of a single multiplication circuit or of two multiplication circuits. In the latter case, one of the multiplication circuits would take care of the positive binary digits and the other multiplication circuit would take care of the negative binary digits.

SPECIFICATION

This invention relates generally to improvements in digital filters. More particularly, it relates to digital filters which are either faster, or less complex, or faster and less complex than those existing in the prior art. For the purposes of this specification, the term "digital filter" is intended to include any linear system that can be functionally described by a linear difference equation.

In recent years, the size and cost of digital components has been decreasing while speed and reliability have been on the increase. These factors make it likely that more and more problems that have in the past been solved with analog circuit elements will, in the future be solved digitally. Filtering (e.g. spectrum shaping) is one such problem. For a further description of digital filters and some of their applications, reference is made to "Digital Filter Design Techniques in the Frequency Domain," C. M. Rader and B. Gold, Proceedings of the IEEE, February 1967, pp. 149–171 and the references cited therein.

There are two significant desirable criteria for digital filters: speed and simplicity. Generally, one of the above criteria will have to be sacrificed to some extent to achieve the other. Prior art filters make use of the tradeoff of speed for simplicity. However, the prior art has not been able to speed up or simplify digital filters sufficiently for them to gain wide acceptance among users of filters.

It is therefore an object of this invention to increase the speed of digital filters.

It is another object of the invention to simplify digital filters.

The above and other objects are accomplished in accordance with one aspect of this invention by providing a digital filter which includes within it multiplication circuitry which is capable of acting upon a mixture of both positive and negative binary digits (bits) occurring within a single coefficient of the filter. Although the use of negative coefficients in digital filters is known in the prior art, coefficients containing both negative and positive bits have not heretofore been used in digital filters.

One feature of this invention is that, in certain cases, its use will permit increased speed of operation of a digital filter.

Another feature is that, in certain cases, the invention will permit the complexity of a digital filter to be reduced.

In some cases, the use of this invention will provide the dual advantages of both a decrease in complexity and an increase in speed of a digital filter.

Still another feature of the invention is that, for those cases in which an increase in speed is obtained, there need be no increase in complexity. Also, for those cases in which complexity is reduced, there need be no decrease in speed.

The foregoing and other objects, features and advantages of the invention will be apparent from the following more particular description of preferred embodiments of the invention, as illustrated in the accompanying drawings.

PRIOR ART

Figure 1:
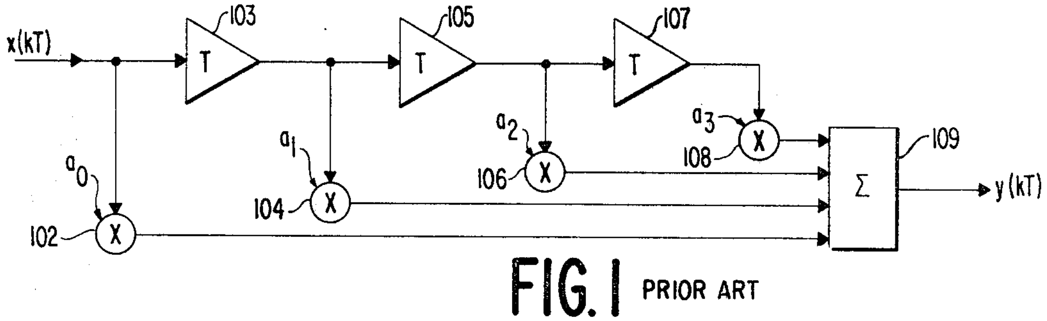
FIG. 1 PRIOR ART
FIG. 1 shows a typical post-multiply digital filter.

Referring to FIG. 1, there is shown a typical post-multiply digital filter. The input to the digital filter consists of data samples taken once in each time period T. The samples are quantized into $n$-bit binary numbers. At any given time $k$T, the input to the digital filter is $x(k\mathrm{T})$ and the output is $y(k\mathrm{T})$. The input signal $x(k\mathrm{T})$ is connected to the input of a multiplier circuit 102 which multiplies the input by a coefficient $a_0$ to form the product $a_0x(k\mathrm{T})$. The input signal is also connected to a delay element 103 which introduces a delay of T units so that the output of delay element 103 at time $k$T will be $x(kT-T)$. In order to form the product $a_1x(kT-T)$, the input of multiplier 104 is connected to the output of delay element 103. The output of delay element 103 is also connected to the input of delay element 105, the output of which is connected to the input of multiplier 106. The signal $x(kT-2T)$ appears at the output of delay element 105 and the product $a_2x(kT-2T)$ appears at the output of multiplier 106. The output of delay element 105 is also connected to the input of delay element 107, the output of which is connected to the input of multiplier 108. Thus, the signal $x(kT-3T)$ appears at the output of delay element 107 and the product $a_3x(kT-3T)$ appears at the output of multiplier 108. The output of each of the multipliers 102, 104, 106, 108 is connected to one input of summing circuit 109, the output of which is the output of $y(k\mathrm{T})$ of the digital filter. Thus it is seen that the output of the digital filter represents the solution to a difference equation, $$y(kT)=a_0x(kT)+a_1x(kT-T)+a_2x(kT-2T)+a_3x(kT-3T)$$

The filter is referred to as a "post-multiply" digital filter because multiplication is performed after the signal has been delayed.

The speed and complexity of the digital filter will be determined primarily by the multipliers 102, 104, 106 and 108. The least complex prior art implementation of the digital filter would result from the use of so-called "repeated addition" multipliers, but these are also among the slowest of multipliers. The digital filter could be speeded up through the use of simultaneous multiply multipliers, but these are among the most complex of multipliers. For further information concerning the above and other multipliers, reference is made to "Digital Design Fundamentals," Y. Chu, copyright 1962 by McGraw-Hill Publishing Co., pp. 444–449.

THE INVENTION

Figure 2:
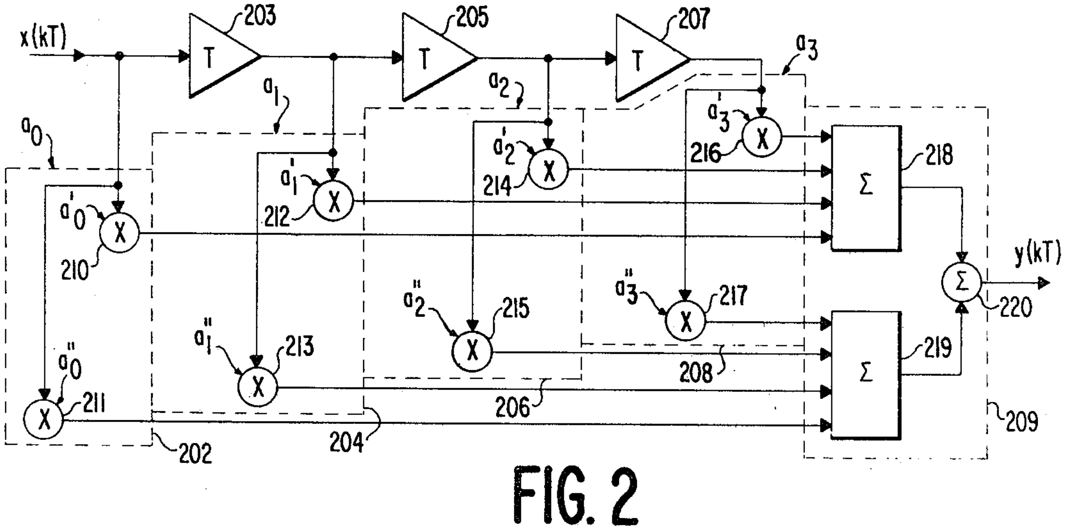
FIG. 2 shows a post-multiply digital filter constructed in accordance with this invention which includes multiplication circuitry for multiplying by a coefficient which contains both positive and negative bits.

Referring to FIG. 2, a digital filter embodying the invention is shown. The input signal $x(k\mathrm{T})$ is connected to the input of delay element 203 the output of which is connected to the input of delay element 205 the output of which is connected to the input of delay element 207 so that the signals $x(kT)$, $x(kT-T)$, $x(kT-2T)$ and $x(kT-3T)$ are available. Multipliers 202, 204, 206 and 208 (each shown in broken lines) are utilized to generate the products $a_0x(kT)$, $a_1x(kT-T)$, $a_2x(kT-2T)$ and $a_3x(kT-3T)$, respectively. The outputs of each of the multipliers are connected to the inputs of summing network 209 (shown in broken lines).

Each of the multipliers 202, 204, 206 and 208 is capable of multiplying by a coefficient that contains both positive and negative bits. What is meant by a "coefficient containing both positive and negative bits" will be made clear by the following example. It is well known that the decimal number "5" can be represented by the binary number $0101=2^2+2^0=4+1$. However, the decimal number "5" can also be represented by the binary number $$10-1-1=2^3-2^1-2^0=8-2-1$$

It is a number such as the binary number 10—1—1 that is described as a "coefficient containing both positive and negative bits."

As is shown in FIG. 2, one manner of implementing the capability is to provide two multipliers (hereinafter referred to as "sub-multipliers") within each of the multipliers 202, 204, 206 and 208. Multiplier 202 contains within it sub-multipliers 210 and 211; multiplier 204 contains within it sub-multipliers 212 and 213; multiplier 206 contains within it sub-multipliers 214 and 215; multiplier 208 contains within it sub-multipliers 216 and 217. Each of the sub-multipliers has its input connected to the input of its associated multiplier. Each of the sub-multipliers 210, 212, 214 and 216 multiplies the signal appearing at its input by a sub-coefficient, designated $a_0'$, $a_1'$, $a_2'$ and $a_3'$ respectively, of the coefficients $a_0$, $a_1$, $a_2$ and $a_3$. The sub-coefficients $a_i'$ consist of the positive binary digits associated with the coefficient $a_i$. For the purpose of multiplication by a sub-coefficient $a_i'$, each negative digit appearing in the coefficient $a_i$ is regarded as being equal to 0. Similarly, each of the sub-multipliers 211, 213, 215 and 217 multiplies the signal appearing at its input by a sub-coefficient, designated $a_0''$, $a_1''$, $a_2''$ and $a_3''$ respectively, of the coefficients $a_0$, $a_1$, $a_2$ and $a_3$. The sub-coefficients $a_i''$ consist of the negative binary digits associated with the coefficient $a_i$. For the purpose of multiplication by a sub-coefficient $a_i''$, each positive binary digit appearing in the coefficient $a_i$ is regarded as being equal to 0. The above can be further clarified by a simple example. Assume that $a_0=10\underline{1}\underline{1}00\underline{1}\underline{1}$, where the symbol "$\underline{1}$" represents the negative binary digit "—1." Then $a_0'=10000001$ and $a_0''=00110010$.

The summing network 209 comprises three summing circuits 218, 219 and 220. In order to obtain a sum of the positive sub-multiplications, summing circuit 218 has its inputs connected to the outputs of submultipliers 210, 212, 214 and 216. The sum of the negative sub-multiplications is obtained by summing circuit 219, the inputs of which are connected to the outputs of sub-multipliers 211, 213, 215 and 217. In order to obtain $y(kT)$, which is equal to the sum in summing circuit 218 minus the sum in summing circuit 219, the outputs of summing circuits 218 and 219 are connected to the input of summing circuit 220.

It will of course be recognized by those skilled in the art that this invention is not limited to the embodiment shown for multipliers 202, 204, 206 and 208. For example, instead of having two separate sub-multipliers 210 and 211 within multiplier 202, a single sub-multiplier could perform the multiplications performed by sub-multipliers 210 and 211 by using the well-known technique of time-sharing. The most significant feature of the multipliers shown in FIG. 2 is that each has the capability of multiplying by a coefficient that has both negative and positive binary digits.

The advantages of the digital filter described above are a result of its abiilty to utilize coefficients that have both positive and negative binary digits. This permits any given set of binary coefficients to be redefined in accordance with the following two simple rules.

Rule 1.—For each string of two or more consecutive binary 1's of the same algebraic sign that appear in a coefficient: change the 0 that precedes the string to a 1; change all but the right-most (lowest order of the 1's in the string to 0's; change the lowest order 1 in the string to a $\underline{1}$. For example, application of this rule would transform a coefficient 0010110111 to $00110\underline{1}100\underline{1}$.

Rule 2.—Whenever two consecutive 1's of opposite sign appear in a coefficient, change them to a 0 followed by a 1, with the 1 having the same sign as the more significant (higher order) of the two consecutive 1's. For example, $1\underline{1}$ becomes 01 and $\underline{1}1$ becomes $0\underline{1}$. Applying this rule, the binary number $00110\underline{1}100\underline{1}$ that was shown above in the example given for Rule 1 will become $010\underline{1}00\underline{1}00\underline{1}$.

Rules 1 and 2 are to be applied to each coefficient until there is no place within the coefficient where two or more consecutive 1's appear. It is important to note that rewriting binary numbers in this manner does not in any way affect the values of the numbers. The rewritten numbers are identical in meaning to the numbers as they appeared in their original form.

EXAMPLE 1

Consider the implementation of a digital filter the coefficients of which (expressed in decimal form) are: $a_0=1.2109$; $a_1=1.1108$; $a_2=0.7764$; $a_3=0.0401$. Rewritten in binary form, the coefficients become:

$$a_0=1.0011010111;\ a_1=1.0001110001$$
$$a_2=0.1100011011;\ a_3=0.0000101001$$

These binary representations have been rounded off to eleven significant binary digits.

If one wished to implement a filter having the above coefficients in accordance with the teachings of the prior art, one of the least complex implementations would be in accordance with FIG. 1 and would utilize repeated addition multipliers. Since a repeated addition multiplier performs a shift-and-add operation for each "1" that appears in the multiplicand, multiplication by $a_0$ would require seven shift-and-add operations, multiplication by $a_1$ would require five shift-and-add operations, multiplication by $a_2$ would require six shift-and-add operations and multiplication by $a_3$ would require three shift-and-add operations. The four multiplications would generally be performed in parallel so that the speed of the prior art filter would be primarily determined by the seven shift-and-add operations performed in conjunction with the coefficient $a_0$.

In order to build the digital filter in accordance with this invention, the above coefficients must first be rewritten by applying Rules 1 and 2 given above. Application of Rule 1 to the coefficient $a_0=1.0011010111$ will yield a rewritten coefficient $a_0=1.010\underline{1}01100\underline{1}$. Since this coefficient contains within it two consecutive 1's Rule 1 is reapplied to obtain $a_0=1.010\underline{1}10\underline{1}00\underline{1}$. Then, application of Rule 2 will yield the coefficient in its final form, $a_0=1.0100\underline{1}0\underline{1}00\underline{1}$. In a like manner, the remaining coefficients can be rewritten as $$a_1=1.00100\underline{1}0001$$
$$a_2=1.0\underline{1}00100\underline{1}0\underline{1}$$
$$a_3=0.0000101001$$

Once the coefficients have been rewritten, the digital filter can easily be implemented in accordance with this invention. In the repeated addition multiplier implementation, each of the multipliers 202, 204, 206 and 208 shown in FIG. 2 will be a repeated addition multiplier. The construction of a repeated addition multiplier utilizing both positive and negative binary digits is within the skill of the art as illustrated by the references already referred to and need not be explained here. The speed with which the multiplication operations are carried out depends upon the number of shift-and-add operations that the multipliers must go through. When the filter is implemented in accordance with this invention, multiplication by $a_0$ requires five shift-and-add operations, multiplication by $a_1$ requires four shift-and-add operations, multiplication by $a_2$ requires five shift-and-add operations and multiplication by $a_3$ requires three shift-and-add operations. The speed of the digital filter will therefore be limited by the five shift-and add operations required for multiplication by $a_0$ and by $a_2$. Since the prior art implementation required seven shift-and-add operations, utilization of this invention has increased the speed of the digital filter by an amount in excess of 25%.

An additional significant increase in speed can be achieved by constructing the digital filter in accordance with this invention by using the sub-multiplier embodiment which has already been described. In this alternative embodiment, the above coefficients can be rewritten as $$a_0'=1.0100000000,\ a_0''=0.0000101001$$
$$a_1'=1.0010000001,\ a_1''=1.0000010000$$
$$a_2'=1.0000100000,\ a_2''=0.0100000101$$
$$a_3'=0.0000101001 \text{ and } a_3''=0.00000000$$

where $a_0=a_0'-a_0''$; $a_1=a_1'-a_1''$; $a_2=a_2'-a_2''$; and $a_3=a_3'-a_3''$. Then a separate repeated addition multiplier can be used for each of the $a_1'$ and each of the $a_1''$ with all multipliers working in parallel. Of course, no multiplier will be needed for $a_3''$ because no negative digits appeared in the rewritten form of $a_3$ (which is identical to the original form of $a_3$). Since none of these multipliers will be performing more than three shift-and-add operations, this implementation will result in a filter that is more than twice as fast as a prior art filter which uses repeated addition multipliers, but which is less than twice as complex as the prior art filter.

If the filter were going to be used in an application for which maximum speed is crucial, then simultaneous multipliers would probably be used. Simultaneous multipliers are far faster than repeated addition multipliers but they are also far more complex. In such cases, a filter using simultaneous multipliers and constructed in accordance with this invention will be far less complex than a prior art filter constructed with simultaneous multipliers. Even though the sub-multiplier embodiment of this invention would generally require twice as many simultaneous multipliers as would the prior art, there would still be a very significant reduction in the total complexity (and thus a reduction in the cost) of the filter as compared with the prior art.

EXAMPLE 2

Figure 3:
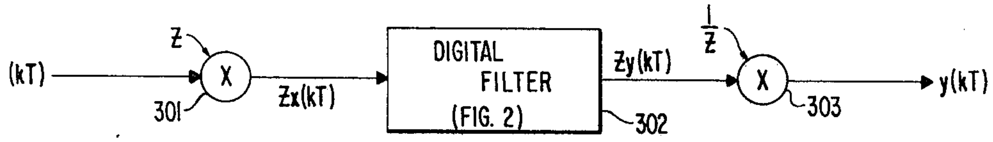
FIG. 3 shows a variation of the digital filter of FIG. 2 which will permit further simplification and/or increased speed of the digital filter.

Referring to FIG. 3, an example of how this invention can be used to further reduce the complexity of and/or increase the speed of digital filters will be described. In FIG. 3, the digitized input signal $x(k\mathrm{T})$ is shown coming into the input of a multiplier 301 which multiplies the signal by a factor Z. The output of multiplier 301 is connected to the input of a digital filter 302 which is constructed in accordance with this invention. The output of digital filter 302 is connected to the input of a multiplier 303 which multiplies its input signal by the factor $1/Z$.

The output of multiplier 301 will be the product $Zx(k\mathrm{T})$. Because the digital filter is a linear device, the output of digital filter 302 will be $Zy(k\mathrm{T})$; that is, it will be Z times the desired output. Then, the output of multiplier 303 will be the desired output $y(k\mathrm{T})$.

Multiplication of the input signal $x(kT)$ by a factor Z is identically equivalent to multiplying each of the coefficients of the filter 302 by the factor Z. Thus, when implementing a filter with a given set of coefficients, it will generally be desirable to first multiply each of the coefficients by various factors and then rewrite the new set of coefficients utilizing the rules described above. Then the various sets of rewritten coefficients can be examined to determine which set will yield the fastest and/or the least complex filter for a given application. If the coefficients that were used in Example 1 above are multiplied by the factor $Z=0.8$, a new set of coefficients will be produced: $Za_0=0.1111100000$, $Za_1=0.1110001110$, $Za_2=0.10011111100$ and $Za_3=0.0000011111$. These coefficients can be rewritten as:

$$Za_0=1.0000\underline{1}00000$$
$$Za_1=1.00\underline{1}00100\underline{1}0$$
$$Za_2=0.1010000\underline{1}00$$

and $$Za=0.000010000\underline{1}$$

Using these new coefficients, $Za_i$, none of which would require more than four shift-and-add operations if implemented with repeated addition multpiliers, a digital filter can be implemented in accordance with this invention that is approximately 40% faster than the corresponding prior art digital filter implementation. The complexity of the filter system will be slightly increased by the addition of the multiplier 303 at the filter output.

If the digital filter 302 is implemented using the submultiplier embodiment that has been described above, then this filter would be approximately 70% faster than the corresponding prior art filter implementation. If the maximum possible speed were desired, the digital filter 302 could be implemented using simultaneous multiply multipliers in the submultiplier arrangement. Such an embodiment would be far less complex than any prior art digital filter using simultaneous multipliers that was constructed in accordance with the specified coefficients, and this filter would be at least as fast as the prior art filter.

Figure 4:
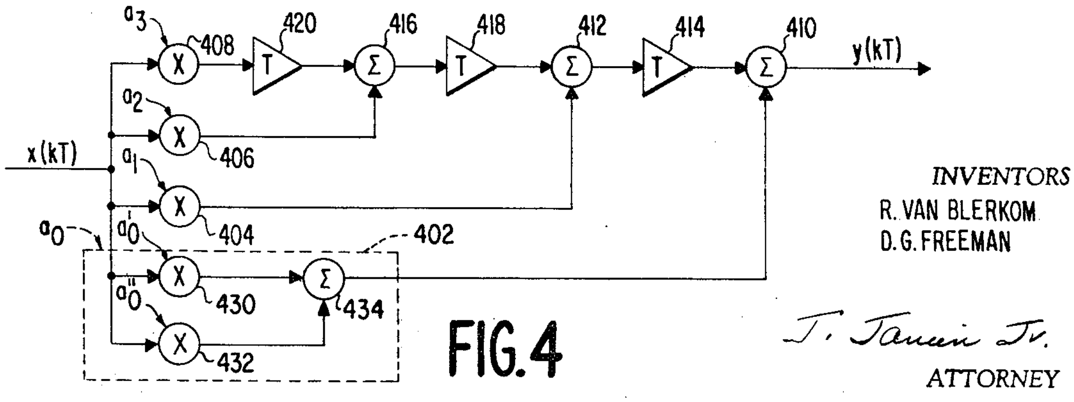
FIG. 4 shows a pre-multiply digital filter incorporating this invention.

Referring to FIG. 4, an embodiment of the invention is shown in the form of a "pre-multiply" digital filter. The term "pre-multiply" applies to filters wherein the input signal is multiplied before it is delayed.

In FIG. 4, the input signal is fed to multipliers 402, 404, 406 and 408 to be multiplied by filter coefficients $a_0$, $a_1$, $a_2$ and $a_3$ respectively. The input to multiplier 402 is connected to the inputs of positive binary digit submultiplier 430 and to the input of negative binary digit submultiplier 432. The outputs of submultipliers 430 and 432 are connected to the inputs of adder 434 which subtracts the negative binary digit product generated in submultiplier 432 from the positive binary digit product generated in submultiplier 430. The output of adder 434 becomes the output of multiplier 402. In order to obtain the term $a_0x(kT)$ in the output of the filter, the output of multiplier 402 feeds one input of adder 410 the output of which is the output $y(kT)$ of the digital filter. In order to obtain the term $a_1x(kT-T)$ in the output of the filter, the output of multiplier 404 feeds one input of adder 412, the output of which feeds the input of delay 414, the output of which feeds a second input of adder 410. The term $a_2x(kT-2T)$ is obtained by feeding the output of multiplier 406 to one input of adder 416, the output of which feeds the input of delay 418, the output of which feeds a second input of adder 412. The term $a_3x(kT-3T)$ is obtained by feeding the output of multiplier 408 to the input of delay 420, the output of which feeds a second input of adder 416. Thus, the output of the digital filter will be $$y(kT)=a_0x(kT)+a_1x(kT-T)+a_2x(k2-2T)+a_3x(kT-3T)$$

Generally, each of the multipliers 402, 404, 406 and 408 will be capable of multiplying by a coefficient containing both positive and negative binary digits as has been described above.

Although the invention has been described in terms of a digital filter having four coefficients, it will be understood that this was for purposes of illustration and that the invention is applicable to a digital filter with any given number of coefficients.

Those skilled in the art will also recognize that the invention can be implemented using a single multiplier that is either shared in real time or is used to sequentially generate the necessary products. Either of these embodiments is a well-known equivalent of the embodiment of the invention that has been illustrated with a plurality of multipliers. In the same manner, the plurality of adders that have been described above in connection with FIG. 4 could be replaced by a single shared adder. However, such an approach will generally not be as practical as that which has been described.

It will also be understood that implementations of this invention are not to be limited to the use of the "repeated addition" multipliers and the "simultaneous multiply" multipliers described above. Any multiplier that can be used to multiply by a coefficient containing both positive and negative binary digits will be suitable for use in this invention. Furthermore, as may be seen from the example given above, it will not always be necessary for all of the multipliers to have this capability. This invention will have advantages over the prior art and includes all embodiments in which one or more multipliers multiplies by a coefficient having both positive and negative binary digits.

Also, the invention is not limited to transversal digital filters. Those skilled in the art will readily recognize that it includes recursive (feedback) digital filters as well.

While the invention has been particularly shown and described with reference to preferred embodiments thereof, it will be understood by those skilled in the art that various changes in form and details may be made therein without departing from the spirit and scope of the invention.

What is claimed is:

1. A digital filter, having a filter input and a filter output, said digital filter comprising:

$n$ signal delay means connected in series, where $n$ is a positive integer, each of said signal delay means having a delay input and a delay output, a first signal delay means of said series having its delay input connected to said filter input;

$n+1$ multiplication means each having a multiplication input and a multiplication output, a first of said $n+1$ multiplication means having its multiplication input connected to said filter input, each of $n$ remaining unconnected multiplication inputs of said $n+1$ multiplication means being connected to a different one of said delay outputs, each of said multiplication means producing a signal at said multiplication output that is a predetermined multiple of a quantized input signal appearing at said multiplication input;

a summing means connected to all of said multiplication outputs and having a summing output, said summing output being connected to said filter output;

wherein at least one of said multiplication means comprises:

product means multiplying said quantized input signal by a binary signal containing both positive and negative binary digits.

2. The digital filter of claim 1 wherein said product means comprises:

means multiplying said quantized input signal by a signal consisting of said positive binary digits; and means multiplying said quantized input signal by a signal consisting of said negative binary digits.

3. A digital filter having a filter input and a filter output, said digital filter comprising:

$n+1$ multiplication means, for producing $n+1$ different multiplication output signals, where $n$ is a positive integer, each of said $n+1$ multiplication means having a multiplication input and a multiplication output, each of said multiplication inputs being connected to said filter input, each of said multiplication output signals being a predetermined multiple of said signal appearing at said filter input;

$n$ delay means, each having a delay input and a delay output, a first one of said delay means having its delay input connected to one of said multiplication outputs;

each of said $n$ delay means having associated therewith an associated summing means, each of said associated summing means having a first input, a second input and a sum output, said delay output of each of said delay means being connected to said first input of said associated summing means, said second input of each of said associated summing means being connected to a different one of $n$ remaining unconnected multiplication outputs of said $n+1$ multiplication means, each of $n-1$ of said sum outputs being connected to a different one of $n-1$ remaining unconnected delay inputs of said delay means such that each of said delay means with its associated summing means is connected in series with all other of said delay means and their associated summing means, an $n$th summing means being the last associated summing means of said series, having its sum output connected to said filter output;

at least one of said multiplication means comprising product means multiplying said signal appearing at said filter input by a binary signal containing both positive and negative binary digits.

4. The digital filter of claim 3 wherein said product means comprises:

means multiplying said quantized input signal by a signal consisting of said positive binary digits; and means multiplying said quantized input signal by a signal consisting of said negative binary digits.

References Cited

UNITED STATES PATENTS

| | | | |
|---|---|---|---|
| 3,281,776 | 10/1966 | Ruehle | 340—15.5 |
| 3,303,335 | 2/1967 | Pryor | 235—152 X |
| 3,314,015 | 4/1967 | Simone | 328—165 |
| 3,371,342 | 2/1968 | Carré | 343—17.1 |

EUGENE G. BOTZ, Primary Examiner

C. E. ATKINSON, Assistant Examiner

U.S. Cl. X.R.

235—164; 328—165; 340—15.5; 343—17.1